Patented Apr. 10, 1945

2,373,568

UNITED STATES PATENT OFFICE 2,373,568

PERFUME MATERIALS

Homer van B. Joy, Montclair, and John B. Rust, Verona, N. J., assignors to Lyndhurst Chemical Corporation, a corporation of New Jersey No Drawing. Application November 20, 1942, Serial No. 466,354

6 Claims. (Cl. 260—586)

This invention relates to perfume materials formed from the reaction of alpha-beta unsaturated carbonyl compounds with conjugated dienes and to the process for making them. It relates particularly to perfume materials formed from the reaction of methacrolein with conjugated dienes.

According to the process of the present invention the methacrolein and diene are mixed and heated in a pressure reactor and then fractionally distilled, preferably under diminished pressure. The condensation products so formed may be reacted with ketones having a reactive methylene group to form additional perfume materials.

The relation between chemical structure and odor is still largely unknown. Often, small structural changes, such as a different position of a methyl group or double bond, may bring about great changes. The odors of the compounds here described could therefore not be predicted on theoretical grounds.

As conjugated dienes, we use 4-methyl pentadiene-1,3 and cyclopentadiene. The reactions probably proceed according to the well-known Diels-Alder mechanism in which the ethylenic double bond of methacrolein adds 1,4 to the diene. The compounds having a reactive methylene group which we react with the above described condensation products are acetone, methyl ethyl ketone, and methyl isobutyl ketone.

*Example 1.*—20 parts of methacrolein was heated with 23.4 parts 4-methyl pentadiene 1,3 in a pressure reactor 8½ hours at 142° C. bath temperature. After removal of unreacted material, a fraction boiling at 60-64° C., at 3½ mm. or 71-74° C. at 8 mm. came over. Pinaceous odor.

*Example 2.*—18 parts of the product prepared in Example 1 was added to a mixture of 54 parts acetone, 2 parts sodium methylate and 18 parts absolute ethanol. The temperature rose to about 40° C. After standing overnight, it was neutralized with oxalic acid, washed with water and distilled. After removal of unreacted material a fraction boiling at 104-109° C. at 3 mm. or 118-123° C. at 5 mm. came over. It had a pinaceous odor, sweeter than the product in Example 1.

*Example 3.*—10 parts of cyclopentadiene was heated with 10.6 parts methacrolein in a pressure reactor one hour at 140-148° C. After removal of unchanged material, a fraction boiling at 79-85° C. at 30 mm. was obtained. The odor was camphoraceous.

*Example 4.*—10 parts of the material prepared in Example 3 was added to a solution of .4 part sodium hydroxide in 8 parts methanol and 16 parts of acetone. The temperature rose rapidly to about 50° C. After standing a few days it was neutralized, washed with water and distilled. A fraction boiling at 114-119° C. at 5 mm. was obtained. The odor was a pleasant, floral type with a note of mint.

The above examples illustrate the practice of the present invention, but are in no way to be construed as limiting. The perfume materials described may be used in a pure state or in mixtures.

We claim:

1. Perfume material consisting of the reaction product of acetone with a compound formed through the Diels-Alder mechanism by heating methacrolein with a conjugated diene selected from the group consisting of 4-methylpentadiene-1,3 and cyclopentadiene.

2. Perfume material consisting of a liquid of boiling point 118-123° C. at 5 mm., and being the reaction product of acetone, with the compound formed through the Diels-Alder mechanism by heating methacrolein with 4-methyl pentadiene-1,3.

3. Perfume material consisting of a liquid of boiling point 114-119° C. at 5 mm., and being the reaction product of acetone, with the compound formed through the Diels-Alder mechanism by heating methacrolein with cyclopentadiene.

4. Process of making perfume material which comprises reacting acetone with a compound formed through the Diels-Alder mechanism by heating methacrolein with a conjugated diene selected from the group consisting of 4-methylpentadiene-1,3 and cyclopentadiene.

5. Process of making perfume material which comprises reacting acetone with the reaction product of 4-methylpentadiene-1,3 and methacrolein.

6. Process of making perfume material which comprises reacting acetone with the reaction product of cyclopentadiene and methacrolein.

HOMER VAN B. JOY.
JOHN B. RUST.